F. A. TAYLOR.
CHAIN CONSTRUCTION.
APPLICATION FILED NOV. 28, 1913.
1,098,597.
Patented June 2, 1914.
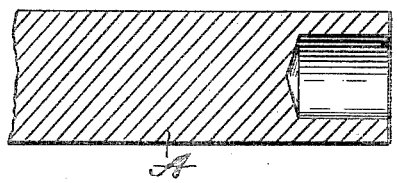
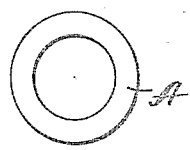
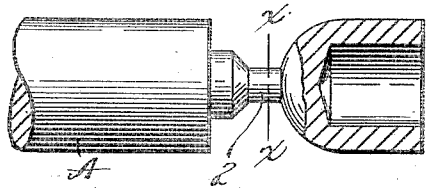
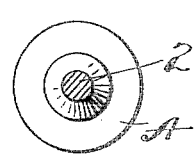
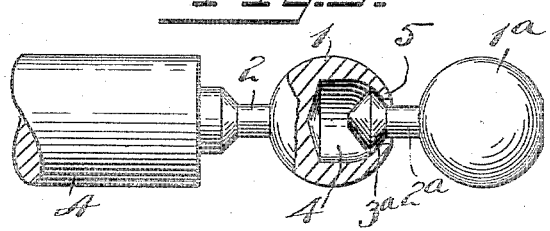
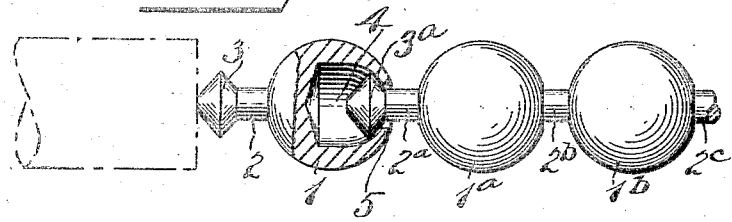
Witnesses:
Inventor
F. A. Taylor
By his Attorneys

UNITED STATES PATENT OFFICE.

FRANKLIN A. TAYLOR, OF WATERBURY, CONNECTICUT.

CHAIN CONSTRUCTION.

1,098,597.  Specification of Letters Patent.  Patented June 2, 1914.

Application filed November 28, 1913. Serial No. 803,384.

*To all whom it may concern:*

Be it known that I, FRANKLIN A. TAYLOR, a citizen of the United States, residing at Waterbury, New Haven county, State of Connecticut, have invented certain new and useful Improvements in Chain Construction, of which the following is a full, clear, and exact description.

My invention relates to an improved chain construction, the object of the invention being to provide a very simple and strong construction which may be employed with effectiveness for chains of small sizes, such for example, as used with the so-called "pull sockets" for incandescent electric lamps. The construction is likewise such that long lengths of chain may be made from ordinary small rods of brass or any other suitable material.

In the drawings Figure 1 is a section on a very much enlarged scale, of one end of a rod showing one step in the process of manufacture of a link therefrom. Fig. 2 is an end elevation thereof. Fig. 3 is a view of the same rod after it has received another manipulation in the process of manufacture, said view being partly in section. Fig. 4 is a section on the line X—X. Fig. 5 is a side elevation of the rod with one link formed thereon but not cut off, the said link being shown in section and associated with the finished link, showing how the links are united. Fig. 6 is a view illustrating how each link is cut off.

Each link itself comprises a substantially spherical hollow seamless body 1—1$^a$—1$^b$, and so on, having relatively thick side walls and each having a shank 2—2$^a$—2$^b$ respectively, extending from one end thereof, the said shanks carrying at their extreme ends heads 3—3$^a$—3$^b$ respectively. The cavity within each body is open at the end opposite its shank. One cavity is shown at 4 and this cavity may be formed by an ordinary boring tool and is made of a sufficient size to loosely receive the head 3$^a$ of an adjacent link 1$^a$.

5 represents an unbroken contraction extending around the bore or cavity 4 at its open end, the diameter of said contraction being slightly greater than the shank located therein so as to permit a certain amount of universal movement between two adjacent links. This contraction is of course sufficiently less than the diameter of the head of the adjacent link to firmly unite the parts.

In the process of manufacture of a link, I employ a bar A of suitable cross-section, and I bore in the end thereof a hole, as shown in Figs. 1 and 2. I then, by means of a suitable cutting tool, or tools, turn down the side of the bar at a suitable point to the rear of the short bore, so as to cause it to approximate the shape indicated in Fig. 3. I then take a finished link and insert its head 3$^a$ in the bore and then force in the edge of the bar around the bore to form the unbroken contraction 5 (see Fig. 5). I then cut off the last formed link by a suitable cutting tool, as indicated in Fig. 6. The bar from which the finished link is cut off is then provided with a bore, as before, and the process repeated, so that by the use of a suitable machine arranged to form and handle the parts, I may produce a continuous chain, link by link, from a length of plain rod.

I have found that a chain constructed as above, though of very small dimensions, is exceedingly strong, because the body 1 is seamless and can not be sprung open by anything except a strain very much in excess of such strain as a chain of small dimensions would be expected to withstand. Obviously, to remove the head of one link from the cavity in an adjacent link would require the deformation of the contracted portion of the link, which contraction being unbroken, is best adapted to withstand a very heavy pulling strain. It will be observed that the shank 2 and the head 3 are integral with each other and with the main body 1, and therefore afford a maximum of strength and resistance to wear. By forming the cavity in the manner described, so that the side walls of each link body 1 are relatively thicker than the thickness of the ring-like contraction at the end of the cavity, the ring-like contraction is powerfully reinforced close up to the points where the strain is applied. Furthermore, by making the side walls of each link body relatively thick, it cannot be easily flattened or laterally deformed, as would be the case if each link body were a mere thin shell.

While my invention is of particular utility in the form of small chain, obviously the mere size is not material.

What I claim is:

1. In a chain of the character described, a link comprising a seamless hollow body open at one end only, a ring-like contraction at said open end, the diameter of said ring-like contraction being less than the diameter of the interior space, a solid shank projecting from the opposite end of said body, and a solid head on said shank spaced away from said body, said body, shank and head being integral.

2. In a chain of the character described, a link comprising a seamless hollow body open at one end only, a ring-like contraction at said open end, the diameter of said ring-like contraction being less than the diameter of the interior space, a solid shank projecting from the opposite end of said body, and a solid head on said shank spaced away from said body, said body, shank and head being integral, said ring-like contraction being unbroken.

3. In a chain of the character described, a link comprising a seamless hollow body open at one end, a ring-like contraction being less than the diameter of the interior space, a shank projecting from the opposite end of said body, and a head on said shank spaced away from said body, said body, shank and head being integral, the side walls of said body being relatively thicker than the thickness of said ring-like contraction.

FRANKLIN A. TAYLOR.

Witnesses:
E. E. MORSE,
L. S. JAMES.